United States Patent [19]

Maruyama et al.

[11] 4,075,173
[45] Feb. 21, 1978

[54] PROCESS FOR THE PRODUCTION OF AROMATIC POLYESTERS FROM HYDROXYBENZOIC ACID AND PRODUCTS THEREOF

[75] Inventors: Takashi Maruyama, Toyonaka; Katsuji Ueno, Hirakata, both of Japan

[73] Assignee: Sumitomo Chemical Company, Limited, Osaka, Japan

[21] Appl. No.: 763,554

[22] Filed: Jan. 28, 1977

[30] Foreign Application Priority Data

Jan. 29, 1976    Japan ................................. 51-8947

[51] Int. Cl.² .......................................... C08G 63/18
[52] U.S. Cl. ................................................. 260/47 C
[58] Field of Search ................................... 260/47 C

[56] References Cited

U.S. PATENT DOCUMENTS 3,637,595   1/1972   Cottis et al. ................... 260/47 C
3,884,876   5/1975   Cottis et al. ................... 260/47 C

*Primary Examiner*—Lester L. Lee
*Attorney, Agent, or Firm*—Birch, Stewart, Kolasch and Birch

[57] ABSTRACT

A process for the production of aromatic polyesters which comprises preparing a prepolymer by subjecting the compounds of the formulae:

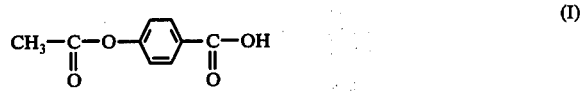

(I)

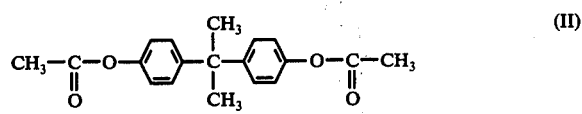

(II)

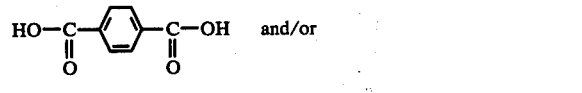

(III)

to heat-polycondensation in the molar ratios of (I) : (II) = 1 : 100 to 100 : 1 and (II) : (III) = 1 : 10 to 10 : 1, pulverizing the prepolymer thus prepared and then heating the resultant in an inert gas or under reduced pressure.

7 Claims, No Drawings

PROCESS FOR THE PRODUCTION OF AROMATIC POLYESTERS FROM HYDROXYBENZOIC ACID AND PRODUCTS THEREOF

BACKGROUND AND SUMMARY OF THE INVENTION

The present invention relates to an improved process for the production of co-polyesters. More particularly, it relates to a process for the production of co-polyesters using an aromatic dicarboxylic acid, diacetate of 2,2-bis(4-hydroxyphenyl)propane (hereinafter, referred to as "bisphenol A") and acetate of p-hydroxybenzoic acid as the starting materials.

It is well known that polyester resins prepared from terephthalic acid and isophthalic acid or functional derivatives thereof and bisphenol A or functional derivative thereof are superior in mechanical properties (e.g. tensile strength, bending strength), thermal properties (e.g. heat distortion temperature, thermal decomposition temperature) and electric properties.

It is known that the polyester resins can be produced by so-called interfacial polymerization process which comprises reacting an aromatic dicarboxylic acid dichloride dissolved in an organic solvent incompatible with water with bisphenols dissolved in an aqueous alkali solution (W. M. Eareckson, J. Polymer, Sci., XL, 399, 1959); by a solution polymerization process which comprises polymerizing the monomers in an organic solvent being capable of dissolving the resulting polymer (Japanese Patent Publication No. 16,793/1963); or by a bulk polymerization process wherein no organic solvent is used (Polymer, 15, 532, 1974).

These processes have both merits and demerits. For instance, when the process is elected from only the economical viewpoint, the polymer produced by the process has inferior performance, but on the other hand, when a polymer having a satisfactory performance is desired, it can not be prepared economically. Thus, there is no process satisfactory in both economy and the excellent performance of the product.

In the interfacial polymerization process, for example, the polymers obtained are less colored and have good performances, but this process has the following disadvantages: the cost for monomers is high because very expensive aromatic dicarboxylic acid dichlorides are used as one of the materials, and the polymerization is carried out in a solution system and hence the solvent must be recovered.

The solution polymerization process is disadvantageous from the economical viewpoint because the recovery of the solvent is costly and further the output per batch is low.

The bulk polymerization process is the most superior process in terms of economy, but it is hardly applicable to the production of aromatic polyesters for the following reasons. Since the aromatic polyesters have a high melting point as compared with aliphatic polyesters, such as polyethylene terephthalate, a higher temperature is required to maintain the aromatic polyesters at their molten state. Consequently, the polymers are colored and deteriorated in the performances thereof so markedly that their value as goods is reduced.

If these problems of coloration and deterioration are solved, this process will have a great significance as an industrial process which is satisfactory in terms of the performance of polymer and economy. Various aromatic polyesters have been produced from various starting materials by the bulk polymerization process in which an ester exchange reaction proceeds in most cases. The representative routes of the process are shown by the following reaction schemes (cf. Polymer, 15, 531–532, 1974):

Route (1)

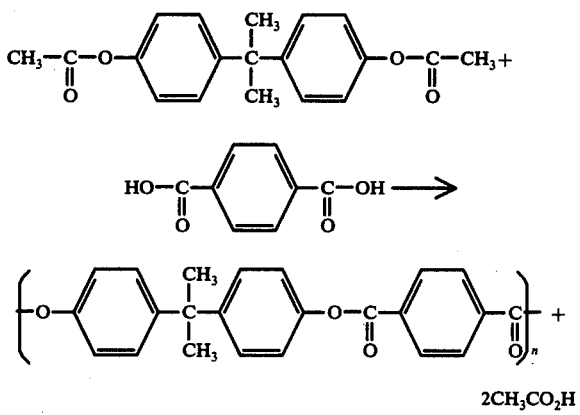

Route (2)

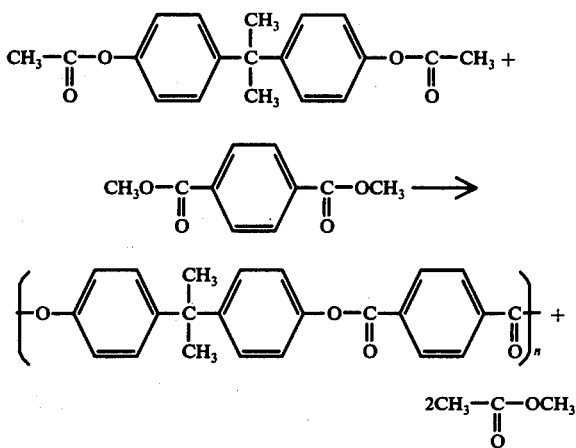

Route (3)

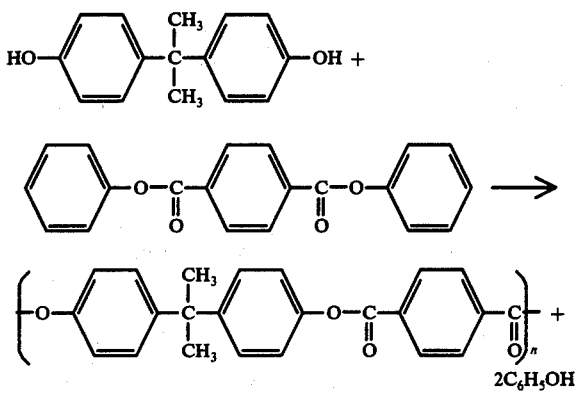

wherein n is the degree of polymerization.

The route (1) wherein deacetylation and condensation proceed at the same time is referred to as "Acetate process" hereinafter.

The route (1) is not desirable because the undesirable coloration and deterioration of polymer are particularly remarkable as disclosed in the above-mentioned literature. The route (2) produces no polymer having a high molecular weight. Consequently, the route (3) is used commonly.

The route (3) is, however, economically disadvantageous in the use of a phenyl ester of carboxylic acid as a monomer, which is not commercially available but is usually produced, for example, by the following reaction wherein hydrochloric acid is used as a catalyst:

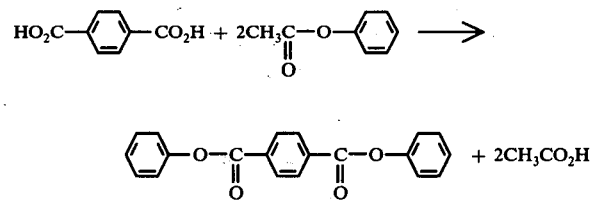

On the other hand, the route (1), Acetate process, is economically advantageous because the materials used are cheap and the operation is simple. For example, diacetate of bisphenol A, a monomer for Acetate process, is synthesized by merely reacting acetic anhydride and bisphenol A. Consequently, it may be said that, if the fatal drawbacks of Acetate process, coloration and deterioration, are solved, Acetate process will become the most superior process.

Besides, when the aromatic polyesters are produced by the bulk polymerization process wherein the ester exchange reaction proceed, the polymerization is carried out at a higher temperature than that in the production of aliphatic polyesters such as polyethylene terephthalate, because the aromatic polyesters have a higher melting point and a higher melt viscosity than those of aliphatic polyesters. In the latter half of the polymerization reaction, the melt viscosity is remarkably increased and the rate of polymerization is retarded so that a long period of time is required for completion of the polymerization. It is, therefore, necessary to powerfully stir the reaction mass by means of a stirring apparatus for high viscosity, by which the surface of the mass is efficiently renewed and by-products having a low boiling point, which are produced by the ester exchange reaction, are removed from the polymerization system under reduced pressure. Furthermore, in order to accelerate the rate of polymerization, a catalyst such as titanium compounds or magnesium compounds is usually used. Thus, according to the bulk polymerization process, the reaction should be carried out at a high temperature for a long time in the presence of a catalyst, which is a major cause for a high degree of coloration of the aromatic polyesters.

It may be thought that the latter half of the polymerization reaction during which the high degree of coloration occurs is replaced by the solid-state polymerization. The conventional solid-state polymerization is usually used in order to convert a high molecular weight polymer having an intrinsic viscosity of about 0.5 g/dl into a polymer having a larger molecular weight. Consequently, when a polymer having a relatively low molecular weight is produced by the solid-state polymerization process, it is somewhat modified. For instance, U.S. Pat. No. 3,684,766 discloses a process wherein a low molecular weight prepolymer is subjected to the solid-state polymerization after crystallized with a crystallizing agent. The use of crystallizing agent is a drawback of this process.

When the solid-state polymerization process is applied to a low molecular weight polymer without such a previous crystallization treatment, it is hardly converted into the desired high molecular weight polymer owing to the remarkable melt-sticking or fusion of the polymer particles, which are disadvantageous for the industrial production of the polymer.

The present inventors have extensively studied a method for applying the solid-state polymerization process to low molecular weight polymers using no crystallizing agent, and have found that this becomes possible only when specific monomers are combined. That is, it has unexpectedly found that when the solid-state polymerization process is applied to a prepolymer obtained from the combination of acetate of bisphenol A, terephthalic acid and/or isophthalic acid and acetate of p-hydroxybenzoic acid, the prepolymer can be converted into the desired high molecular weight polymer without substantial occurrence of the melt-sticking between polymer particles. Furthermore, it has been found that when p-acetoxybenzoic acid is copolymerized according to the process of the present invention, a polymer having an extremely lower degree of coloration and more excellent heat resistance and mechanical properties can be obtained at a higher rate of polymerization as compared with the process as described in U.S. Pat. No. 3,684,776.

An object of the present invention is to provide a process for the production of aromatic polyesters having an extremely low degree of coloration and an excellent heat stability.

Another object of the invention is to provide an improved process for producing economically the desired aromatic polyesters.

A further object of the invention is to provide a process for the production of the desired aromatic polyesters without occurrence of the melt-sticking between the polymer particles by applying the solid-state polymerization process to a prepolymer produced from a specific combination of monomers.

Other objects and further scope of the applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will becomes apparent to those skilled in the art from this detailed description.

According to the present invention, there can be produced a polymer having an extremely low degree of coloration and an excellent heat stability which has been considered to be hardly obtainable by the conventional bulk polymerization, i.e. Acetate process. In the process of the present invention, any special equipment, such as a powerful stirring apparatus for high viscosity, is not required, which is a great significance for the industrial production thereof.

The present invention will be illustrated in more detail hereinafter.

A prepolymer is first prepared by condensing the following compounds of the formulae:

(I)

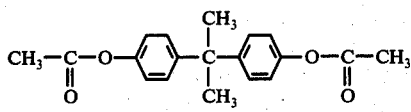

and/or

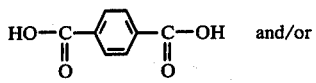

with heating in the molar ratios of (I) : (II) = 1 : 100 to 100 : 1, preferably 1 : 10 to 10 : 1, (II) : (III) = 1 : 10 to 10 : 1, preferably about 1 : 1, and terephthalic acid : isophthalic acid = 100 : 0 to 0 : 100, preferably 100 : 0 to 50 : 50, while allowing the resulting acetic acid to be distilled off.

The individual conditions for the preparation of prepolymer are as follows.

It is desirable to maintain the reaction temperature as low as possible to prevent the coloration of polymer, while as high a reaction temperature as possible is preferred in terms of the rate of reaction and melt viscosity of polymer. Suitable temperature is properly determined under taking these points into account. Suitable range of the temperature is, for example, 200° to 380° C, more preferably 250° to 330° C, and in this case, the reaction time is 1 to 10 hours.

During the heat-condensation, it is desirable to carry out the reaction under reduced pressure or in the stream of an inert gas such as nitrogen or argon in order to accelerate distillation-off of the resulting acetic acid.

Catalysts may be used to accelerate the rate of polymerization. All the conventional catalysts being capable of accelerating an ester exchange reaction are usable. Suitable examples of the catalysts are metal oxides (e.g. magnesium oxide, lead oxide, zinc oxide, antimony trioxide); alkoxides which are prepared by the reaction of an alcohol or glycol and an alkali metal, alkaline earth metal, aluminum or titanium; sodium acetate and sodium benzoate; metal hydrides and metal borohydrides [e.g. lithium hydride, potassium borohydride ($K_2B_2H_6$)]; and disodium salt of bisphenol A. It is however desirable to use no catalyst in terms of the coloration and heat stability of polymer.

The compounds (I) and (II) used in the present invention are prepared by reacting p-hydroxybenzoic acid and bisphenol A with acetic anhydride, respectively. These compounds may, of course, be used for the polymerization as they are in the form of a reaction mixture without isolation thereof. For instance, the following procedure may be employed. Bisphenol A, terephthalic acid, p-hydroxybenzoic acid are added to acetic anhydride and the mixture is reacted for a predetermined period of time. After removing the resulting by-product (e.g. acetic acid) by distillation, the resulting mixture is subjected to the polycondensation reaction with heating. This method is rather preferred for the industrial purpose.

In the present invention, a part of diacetate of bisphenol A may be replaced by a small amount of diacetate of other bisphenols or glycols. Likewise, a part of terephthalic acid or isophthalic acid may also be replaced by a small amount of other dicarboxylic acids. Suitable examples of other bisphenol diacetates and glycols are hydroquinone, resorcin, nuclear-halogenated bisphenol A [e.g. 2,2-bis(4-hydroxy-3,5-dibromophenyl)propane], diacetates of bisphenols [e.g. bis(4-hydroxy-3,5-dimethylphenyl)propane, bis(4-hydroxyphenyl)ether, bis(4-hydroxyphenyl)thioether, bis(4-hydroxyphenyl)sulfone], and glycols (e.g. ethylene glycol, propylene glycol, 1,4-butanediol). Suitable examples of other dicarboxylic acids are aliphatic dicarboxylic acids (e.g. adipic acid, sebacic acid), and the like.

In the present invention, it may further be possible to control the molecular weight of polymer by adding an acetate of mono-valent phenol or a mono-valent aliphatic or aromatic carboxylic acid in the step of the prepolymerization or the solid-state polymerization.

The prepolymer thus obtained are converted into a high molecular weight polymer by the solid-state polymerization. For instance, the prepolymer is pulverized by a breaker or pulverizer, or pelletized by a pelletizer and heated under reduced pressure or in an inert gas, and thereby it is converted into a high molecular weight polymer useful as industrial materials.

In the solid-state polymerization reaction, the temperature may gradually be raised by heating from a low temperature to a high temperature over a long period of time. It is, however, better to preheat the reaction mass at a low temperature and then to raise the temperature in order to prevent the melt-sticking between the polymer particles and to shorten the heating time. Preferred preheating temperature and time are 100° to 200° C and 5 to 30 hours, respectively.

After the preheating, the temperature of the reaction mixture is raised continuously or discontinuously. The former continuous heating process means that the temperature is continuously elevated, and the latter discontinuous heating process means that the temperature is stepwise elevated, in other words, the temperature is mainatined at a definite level for a definite time and is elevated to a higher temperature, at which the temperature is maintained for a definite time, and this operation is repeated until it reaches the desired temperature. The rate of the rise of temperature, initial temperature, final temperature and heating time depend upon various factors, such as the composition of monomers, the desired molecular weight of the polymer, the desired physical properties of the polymer and the like, and are easily determined under taking these points into account. The final temperature is lower than 380° C, preferably lower than 350° C. The rate of the rise of temperature is generally 1° to 20° C/hour. The rate of the rise of temperature herein means (final temperature — initial temperature)/time required for the rise of temperature. In the solid-state polymerization, the conventional drying apparatus may be used as the apparatus of heating. For example, any of the hot-air circulating dryer, fluidized-bed dryer and rotary dryer may be used for drying.

The polymer thus obtained have an extremely low degree of coloration and excellent heat resistance and mechanical properties, which has been considered to be impossibly produced by the conventional bulk polymerization process (i.e. Acetate process). The present polyesters may also be used together with the well-known plasticizers, pigments, lubricating agents, mold release agents, stabilizers, inorganic fillers and the like.

The present invention will be illustrated with reference to the following examples and reference examples, which are only given for the purpose of illustration and are not to be interpreted as limiting the invention thereto.

EXAMPLE 1

In a four-necked separable flask equipped with a reflux condenser and stirrer were charged 124.2 g (0.9 mole) of p-hydroxybenzoic acid, 68.4 g (0.3 mole) of bisphenol A, 49.8 g (0.3 mole) of terephthalic acid and 168.3 g (1.65 mole) of acetic anhydride. The mixture was reacted with stirring at about 140° C (reflux temperature) for 4 hours under nitrogen atmosphere. While elevating the temperature gradually in the stream of nitrogen gas, acetic acid and unreacted acetic anhydride were distilled off. The reaction mixture was stirred while gradually raising the temperature up to 300° C. The time required for the rise of temperature from 200° to 300° C was 3 hours. After stopping the stirring, the contents of the flask were immediately poured onto an aluminum dish to give a prepolymer having a reduced viscosity of 0.22 dl/g.

The prepolymer thus obtained was pulverized by a pulverizer, placed on an evaporation dish and preheated at 180° C for 10 hours in a hot-air dryer while passing nitrogen gas. After the temperature in the dryer was immediately elevated to 210° C, the prepolymer was kept at this temperature for 5 hours, and thereafter, it was immediately heated to 240° C and kept at this temperature for 5 hours. Thus, the solid-state polymerization was completed.

The polymer thus obtained was slightly melt-stuck, but it was easily crushed into pieces with a finger. Consequently, melt-sticking was not substantially observed. This polymer gave a good molded product when pressed at 330° C and 100 kg/cm², and had a reduced viscosity of 0.72 dl/g and a Vicat softening point of 230° C.

REFERENCE EXAMPLE 1

136.8 g (0.6 mole) of bisphenol A, 69.72 g (0.42 mole) of terephthalic acid, 29.88 g (0.18 mole) of isophthalic acid and 122.4 g (1.2 mole) of acetic anhydride were charged in the same reaction apparatus as used in Example 1. After stirring the mixture for 4 hours at a reflux temperature, the distillation-off of acetic acid and acetic anhydride was started. Stirring was further continued and, when the temperature reached 300° C, the prepolymer in the flask was taken out and pulverized. Next, the solid-state polymerization was carried out in the same manner as described in Example 1.

The polymer thus obtained had a complete molten form and the original powdery form was not observed. This polymer was molded at 330° C and 100 kg/cm² using a press but the molded product obtained was very brittle and unsatisfactory. As mentioned above, a remarkable melt-sticking of polymer occurs on the solid-state polymerization, when p-hydroxybenzoic acid is not used as a copolymerization component. Consequently, this method is unsuitable for industrial production.

EXAMPLES 2 to 4

Prepolymers were prepared in the same manner as in Example 1, using the monomer compositions as shown in Table 1 and subjected to the solid-state polymerization. The polymerization conditions, softening points of the polymers obtained and degrees of coloration of pressed products are shown in Table 1. Every product obtained was stiff.

Table 1

| Example No. | Terephthalic acid (mole) | Isophthalic acid (mole) | Bisphenol A diacetate (mole) | p-Acetoxybenzoic acid (mole) | Conditions for solid-state polymerization Temp. (° C) | Time (hour) | Softening point (° C)*1 | Coloration degree of pressed product*2 |
|---|---|---|---|---|---|---|---|---|
| 2 | 2 | — | 2 | 1 | 180 / 210 / 240 | 10 / 5 / 5 | 350 | Almost colorless and transparent |
| 3 | 0.5 | 0.5 | 1 | 3 | 180 / 210 / 240 | 15 / 6 / 3 | 320 | slightly pale yellow |
| 4 | 1 | — | 1 | 5 | 200 / 210 / 240 / 270 / 300 | 5 / 5 / 3 / 3 / 3 | 400 | White |

[Remarks]:
*1 Temperature at which the polymers were molten or decomposed when heated under atmospheric pressure.
*2 The polymers were molded at 330° C and 100 kg/cm² using a mold [40 mm × 20 mm × x mm (thickness)]

What is claimed is:

1. A process for producing an aromatic polyester which comprises preparing a prepolymer by subjecting the compounds of the formulae:

 (I)

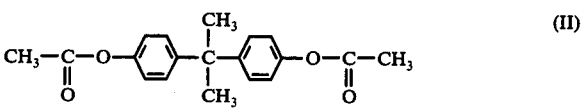 (II)

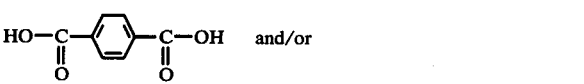 and/or

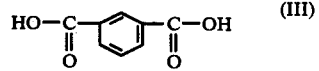 (III)

to heat-polycondensation at a temperature of 200°–380° C in the molar ratios of (1) : (II) = 1 : 100 to 100 : 1 and (II) : (III) = 1 : 10 to 10 : 1, pulverizing the prepolymer thus prepared and then heating the resultant in an inert gas or under reduced pressure at a temperature within the range of 200° to less than 380° C while raising the temperature at the rate of 1° to 20° C/hour.

2. The process according to claim 1, wherein the molar ratio of (I) to (II) is 1 : 10 to 10 : 1.

3. The process according to claim 1, wherein the molar ratio of (II) to (III) is about 1 : 1.

4. The process according to claim 1, wherein the molar ratio of terephthalic acid to isophthalic acid is 100 : 0 to 50 : 50.

5. The process according to claim 1, wherein said heat-polycondensation is carried out for 1 to 10 hours.

6. The process according to claim 1, wherein said prepolymer is preheated at 100° to 200° C for 5 to 30 hours in an inert gas or under reduced pressure prior to said heating.

7. An aromatic polyester obtained by the process as set forth in claim 1.

* * * * *